UNITED STATES PATENT OFFICE.

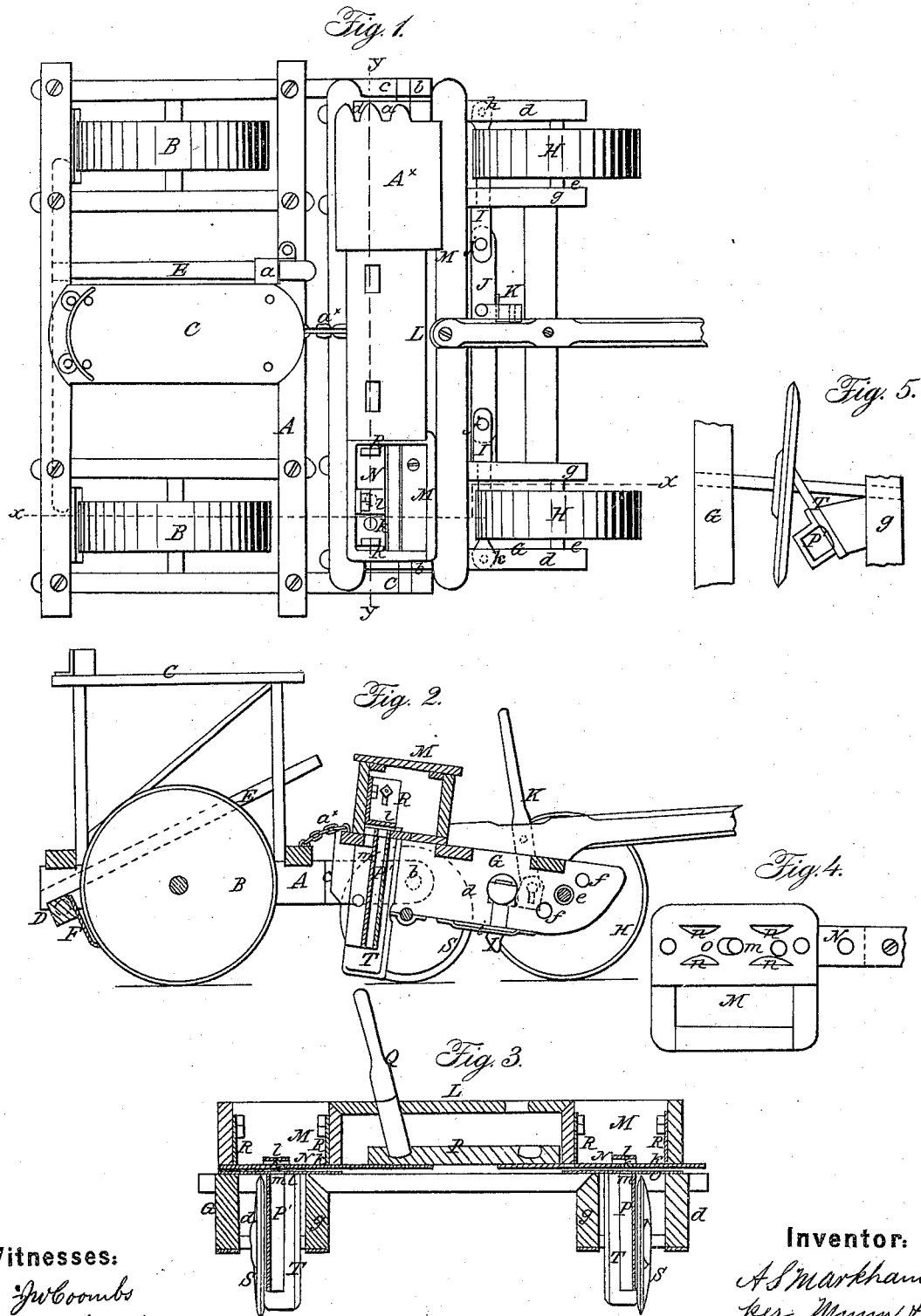

A. S. MARKHAM, OF MONMOUTH, ILLINOIS.

IMPROVEMENT IN CORN-PLANTERS.

Specification forming part of Letters Patent No. 40,418, dated October 27, 1863.

*To all whom it may concern:*

Be it known that I, A. S. MARKHAM, of Monmouth, in the county of Warren and State of Illinois, have invented a new and Improved Seed-Planting Machine; and I do hereby declare that the following is a full, clear, and exact description of the same, reference being had to the accompanying drawings, making a part of this specification, in which—

Figure 1 is a plan or top view of my invention; Fig. 2, a side sectional view of the same, taken in the line $x\,x$, Fig. 1; Fig. 3, a transverse vertical section of the same, taken in the line $y\,y$, Fig. 1; Fig. 4, a detached inverted plan of one of the seed-boxes; Fig. 5, a detached plan of one of the seed-conveying tubes and furrow-openers.

Similar letters of reference indicate corresponding parts in the several figures.

This invention relates to a new and improved seed-planting machine of that class designed for planting seed in hills or drills.

The object of the invention is to obtain a machine which will plant the seed at a uniform depth, and at the same time prepare the earth in a proper condition to receive it.

The invention also has for its object the obtaining of an efficient scraping device for the purpose of keeping the wheels of the machine clean; and, further, it has for its object the obtaining of a means for admitting of the ready escape of dust and fine foreign substances from the seed-boxes, as well as a simple and efficient device for dropping the seed in check-rows.

To enable those skilled in the art to fully understand and construct my invention, I will proceed to describe it.

A represents a rectangular frame, which is mounted on two wheels, B B, and has a driver's seat, C, secured upon it.

D is a shaft, which is fitted in proper bearings underneath the frame A, at its back part, and is allowed to turn freely in its bearings. This shaft has a lever, E, attached to it at right angles, said lever projecting forward to the front end of the frame A, and fitted within a guide, $a$. To each end of the shaft D there is attached a scraper, F. These scrapers are of metal, and are directly back of the wheels B B, the scrapers projecting down from the shaft D, as shown clearly in Fig. 2. The scrapers F, in order to operate perfectly, should have an oblique position relatively with the wheels B B. By this arrangement the peripheries of the wheels B B are kept perfectly clean and by a self-acting device, for when the peripheries of the wheels B have earth adhering to them the earth will come in contact with the scrapers F, and the latter will have their lower edges drawn against the wheels, the shaft D being allowed to turn on its bearings for that purpose; and when the wheels B are cleaned the weight of the lever E is designed to be sufficient to throw the scrapers out from the wheels, so that when the use of the scrapers are not required there will be no unnecessary friction.

To the front part of the frame A there is attached by pins or bolts $b\,b$ a rectangular frame, G, said pins or bolts passing through the projecting ends of the side pieces $c\,c$ of the frame A and into the side pieces $d\,d$ of the frame G. (See Fig. 1.) The frame G is supported by two wheels, H H, the axes $e$ of which pass through any of a series of holes, $f$, made in the side pieces $d\,d$ and in longitudinal bars $g\,g$, which are parallel with the side pieces $d\,d$ and are at the inner sides of two wheels, H H. The holes $f$ are made in an inclined line in the side pieces $d$ and bars $g$, (see Fig. 2,) and are designed for raising and lowering the front part of the frame G, in order to regulate the depth of the furrow-shares as may be required.

To the under surfaces of the side pieces $d\,d$ there are attached by pivot-bolts $h\,h$ scrapers I I, one to each side piece. These scrapers are constructed of metal plates, and they project inward and pass underneath guides $i$, attached to the under surfaces of the bars $g$, and are then bent horizontally over the ends of a bar, J, to which they are attached by pivot-bolts $j$. (See Fig. 1.) The bar J has a lever, K, attached to it, which extends upward within reaching distance of a seat, L, on which the seed-dropping attendant sits. By shoving the lever K forward it will be seen that the scrapers I I will be thrown back from the wheels H H, and when said wheels become foul or clogged up with earth by throwing said lever K forward the scrapers I will press against the peripheries of the wheels H and clean them.

M M are two seed-boxes, which are placed on the frame G, one at each side of it; and to the inner edges of these boxes the seat L is attached, as shown clearly in Fig. 3.

N N are two metal bars, which work over metal plates O O, attached to the bottoms of the seed-boxes M M. The inner ends of the metal bars N N are attached to a wooden bar, P, in which a lever, Q, is fitted, said lever extending up through the seat L, as shown clearly in Fig. 3. The bars N N, by actuating the lever Q, are made to slide in the boxes M with a reciprocating movement, and the seed is discharged from the boxes by means of perforations $k$, which are made in the bars N, and become filled with seed and are drawn underneath cut-offs $l$ and in line with perforations $m$ in the plates O, the seed falling through $m$ and into tubes P', which conduct the seed into the furrows. The plates O O, besides the perforations $m$, have oblong perforations $n$ made in them, to admit of the escape of dust and fine foreign substances from the seed-boxes. This dust and fine particles or substances will work underneath the bars N N and out through the perforations $n$, which are shown clearly in Fig. 4.

The boxes M have adjustable slides R, attached to their inner sides, the lower ends of said slides bearing upon the bars N. These adjustable slides admit of thicker or thinner bars N being used, as may be required, so as to vary the quantity of seed discharged at each dropping, for the thicker the bars N are the greater of course the capacity of the perforations $k$.

In the frame G, directly behind the wheels H, there are circular rotating colters S S, one behind each wheel H. These colters have a slightly oblique position relatively with the wheels H, so as to have a tendency to raise up the earth and pulverize it at their rear; and to the frame G there are attached two pendent metal plates, T T, the lower edges of which are sharpened. These plates T T have an oblique position relatively with the colters S, forming with the colters a V-shaped space behind their front ends, and also forming furrow openers or shares, the seed being dropped through the tubes P', the tubes being secured to the plates T. (See Figs. 2, 3, and 5.) The lids $A^x$ of the seed-boxes M are notched, as shown at $a^x$, in order to enable the person who operates the bars N to range the machine with the hills previously dropped or planted, and thereby cause the seed to be dropped in check-rows. As the machine is drawn along the wheels H smooth the ground, while the colters S cut through all weeds and trash which may lie in their path, and thereby enable the plates T to work without any disadvantage of obstructions, and cause proper furrows to be made to receive the seed. This is an important feature of the invention. The depth of the furrows, as before stated, and as now will be clearly seen, is regulated by adjusting the front part of the frame G higher or lower. The furrow shares or openers may be elevated above the ground at any time by the driver throwing his weight back on the seat C, a chain, $a'$, limiting this movement of the frames. The wheels H, it will be seen, take all the weight from the necks of the draft-animals.

Having thus described my invention, what I claim as new, and desire to secure by Letters Patent, is—

1. The wheels H, secured in the front part of the frame G by means of adjustable axes $e$, in combination with the rotary colters S and furrow-shares T, all arranged to operate as and for the purpose herein set forth.

2. The particular arrangement of the furrow-shares T—with the colters—to wit, the former having an oblique position relatively with the latter, so as to leave a V-shaped space between them in which the seed-conveying tubes P' are placed.

3. Providing the plates O with perforations $m$, substantially as shown, to admit of the escape of dust and fine foreign substances from the seed-boxes M.

4. The self-adjusting scrapers F, attached to the shaft D, which is provided with a lever, E, and all arranged as and for the purpose set forth.

5. Providing the lids $A^x$ of the seed-boxes M with notches $a^x$, substantially as and for the purpose specified.

A. S. MARKHAM.

Witnesses:
O. T. REESE,
DANIEL MARKHAM.